US011653682B2

(12) United States Patent
Pippin

(10) Patent No.: US 11,653,682 B2
(45) Date of Patent: May 23, 2023

(54) APPARATUS AND METHOD FOR INTRODUCING A LIQUID INTO A SEALED FOOD PACKAGE

(71) Applicant: Steven Pippin, Farmington, MO (US)

(72) Inventor: Steven Pippin, Farmington, MO (US)

(*) Notice: Subject to any disclaimer, the term of this patent is extended or adjusted under 35 U.S.C. 154(b) by 41 days.

(21) Appl. No.: 17/246,455

(22) Filed: Apr. 30, 2021

(65) Prior Publication Data

US 2021/0251428 A1    Aug. 19, 2021

Related U.S. Application Data

(63) Continuation-in-part of application No. 15/843,329, filed on Dec. 15, 2017, now abandoned.

(60) Provisional application No. 62/435,549, filed on Dec. 16, 2016.

(51) Int. Cl.
| | | |
|---|---|---|
| *A61M 39/02* | (2006.01) | |
| *A61J 1/14* | (2023.01) | |
| *A47J 43/00* | (2006.01) | |
| *A23L 23/00* | (2016.01) | |
| *B05C 21/00* | (2006.01) | |

(52) U.S. Cl.
CPC .............. *A47J 43/00* (2013.01); *A23L 23/00* (2016.08); *B05C 21/00* (2013.01); *A23V 2002/00* (2013.01)

(58) Field of Classification Search
CPC ..... A23L 13/72; A23L 23/00; A23V 2002/00; A47J 43/00; A47J 43/16; A47J 43/28; A61B 50/20; A61J 1/1406; A61J 1/1475; B05C 21/00; B65D 51/002; B65D 81/20; A23B 4/28

USPC .................. 220/361; 604/415; 222/107, 563; 383/66, 93; 99/532–536; 426/112, 120, 426/250, 281
See application file for complete search history.

(56) References Cited

U.S. PATENT DOCUMENTS

| | | | | |
|---|---|---|---|---|
| 2,598,595 A | * | 5/1952 | Peters ................... | B65D 75/52 426/112 |
| 3,030,955 A | * | 4/1962 | Gossett ................. | A61J 1/10 604/404 |
| 3,306,563 A | * | 2/1967 | Soto ...................... | A61J 1/2089 156/60 |
| 3,685,680 A | * | 8/1972 | Tenckhoff ............. | A61M 1/28 604/153 |
| 3,762,307 A | * | 10/1973 | Badovinac ........... | A22C 17/0053 D7/670 |
| 3,900,028 A | * | 8/1975 | McPhee ................ | A61J 1/1406 215/247 |
| 4,445,550 A | * | 5/1984 | Davis .................... | B65D 37/00 141/330 |
| 4,632,673 A | * | 12/1986 | Tiitola ................... | B29C 66/112 604/111 |
| 4,698,061 A | * | 10/1987 | Makaryk ............... | A61M 5/00 604/408 |

(Continued)

*Primary Examiner* — Gideon R Weinerth
(74) *Attorney, Agent, or Firm* — Michael C. Balaguy

(57) ABSTRACT

A ported marinade injection system useful for injecting flavoring fluids into vacuum-packaged meats. The apparatus may include a package couple, a port support couple, an injection port, a self-sealing port, and a port cover. The apparatus may be used by attaching the package couple and the port support couple to a package, attaching the self-sealing port and the injection port to the port support couple, injecting a marinade or other flavoring, and covering the port to seal the flavoring within the package.

2 Claims, 5 Drawing Sheets

(56) References Cited

U.S. PATENT DOCUMENTS

| | | | |
|---|---|---|---|
| 4,919,955 A * | 4/1990 | Mitchell | B65B 31/08 426/316 |
| 5,611,792 A * | 3/1997 | Gustafsson | A61J 1/1406 604/167.03 |
| 5,718,682 A * | 2/1998 | Tucker | A61M 39/0208 604/288.02 |
| 5,934,187 A * | 8/1999 | Leon | A23B 4/28 99/345 |
| 5,961,210 A * | 10/1999 | McCardel | B65D 75/5894 604/416 |
| 6,070,397 A * | 6/2000 | Bachhuber | B65B 31/08 206/524.8 |
| 7,770,360 B2 * | 8/2010 | Smith | B65D 75/5866 53/410 |
| 8,777,050 B1 * | 7/2014 | Joshi | F16K 1/30 220/666 |
| 8,827,978 B2 * | 9/2014 | Ellstrom | A61J 1/1481 206/438 |
| 8,936,044 B1 * | 1/2015 | Chen | B65B 31/04 383/103 |
| 2003/0233083 A1 * | 12/2003 | Houwaert | A61J 1/10 220/202 |
| 2009/0082734 A1 * | 3/2009 | Walters | A61J 1/1406 604/165.01 |
| 2010/0228196 A1 * | 9/2010 | Wyss | A61M 5/148 604/151 |
| 2010/0249745 A1 * | 9/2010 | Ellstrom | A61J 1/20 604/414 |
| 2012/0284991 A1 * | 11/2012 | Kusz | A61M 39/12 137/315.01 |
| 2013/0269827 A1 * | 10/2013 | Thomas, Jr. | A61J 1/2093 141/2 |
| 2015/0264967 A1 * | 9/2015 | Adams | A22C 9/001 99/533 |
| 2018/0168207 A1 * | 6/2018 | Pippin | A47J 43/16 |
| 2018/0280235 A1 * | 10/2018 | Franca | A61J 1/1406 |
| 2019/0009074 A1 * | 1/2019 | Drmanovic | A61L 2/16 |
| 2019/0117510 A1 * | 4/2019 | Pallares | A61J 1/1481 |
| 2021/0251428 A1 * | 8/2021 | Pippin | A47J 43/00 |

* cited by examiner

- Providing 500
- Removing 501
- Adhering 502
- Removing 503
- Adhering 504
- Inserting 505
- Coupling 506
- Screwing 507
- Unscrewing 508
- Decoupling 509
- Removing 510

FIG. 5

APPARATUS AND METHOD FOR INTRODUCING A LIQUID INTO A SEALED FOOD PACKAGE

CROSS-REFERENCE TO RELATED APPLICATION

The present application is a continuation-in-part of U.S. Non-provisional patent application Ser. No. 15/843,329, filed Dec. 15, 2017, pending, which is related to and claims priority to U.S. Provisional Patent Application No. 62/435,549, filed Dec. 16, 2016. Both applications are incorporated by reference.

BACKGROUND OF THE INVENTION

The following includes information that may be useful in understanding the present disclosure. It is not an admission that any of the information provided is prior art nor material to the presently described or claimed inventions, nor that any publication or document that is expressly or implicitly referenced is prior art.

FIELD OF THE INVENTION

The present invention generally relates to food or edible material processes, compositions, and products and more specifically relates to the internal application of nontransitory fluent material to a solid edible by injecting artificial pore formation or external pressure.

DESCRIPTION OF RELATED ART

Closures are fastening devices used to seal a container. Closures may seal a container using mechanical means, adhesives, friction fits, or other methods. Different containers may require seals of different seal strengths; for example, some containers may need to be air-tight while others may only need to retain significant solid components. However, many packages which are not designed to be reusable may lack closures of any sort. This may cause difficulties when the contents of a container need to be changed or added to. In particular, food products with disposable packaging may be impossible to access without transferring them to a reusable container. A suitable solution is desired.

U.S. Pub. No. 2010/0178398 to Victor Kingsun Wai, et al. relates to a marinating apparatus and process. The described marinating apparatus and process includes a marination device for marinating a food item. The marination device includes a flavor injector configured to inject during a first stage marinating process liquid preparation into the food. A vacuum canister configured to pressurize to a negative pressure state during a second stage marinating process the food. The food is vacuumed to remove the air in the food, and re-pressurized to an atmospheric state in the vacuum canister to imbue the liquid preparation into the food.

BRIEF SUMMARY OF THE INVENTION

Given the preceding disadvantages inherent in the known food or edible material, processes, compositions, and products art, the present disclosure provides a novel apparatus and method for introducing a liquid into a sealed food package. This disclosure is to provide a ported marinade injection system useful for injecting flavoring fluids into vacuum-packaged meats. The device may include a package couple, a port support couple, an injection port, a self-sealing port, and a port cover. The device may be used by attaching the package couple and the port support couple to a package, attaching the self-sealing port and the injection port to the port support couple, injecting a marinade or other flavoring, and covering the port to seal the flavoring within the package.

An apparatus for introducing a liquid into a sealed food package via an injector needle is disclosed. The apparatus for introducing a liquid into a sealed food package via an injector needle includes an adhesive base, an injection port, and a self-sealing port. The adhesive base includes a package couple and a port support couple, the package couple configured to attach to the sealed food package adhesively. The injection port includes a package base interface and a seal retainer; the package base interface is configured to removably couple with the port support couple of the adhesive base. The self-sealing port is affixed to the seal retainer and configured to permit insertion of the injector needle into the sealed food package while otherwise maintaining a seal of the sealed food package; the self-sealing port is further configured to maintain the seal upon removal of the injector needle.

A method of using an apparatus for introducing a liquid into a sealed food package via an injector needle is also disclosed. The method includes the first step of providing the apparatus described above, wherein the package couple includes an adhesive layer configured to attach to the sealed food package adhesively and a removable masking layer removably affixed to the adhesive layer and configured to maintain adhesive properties of the adhesive layer until removed, and also includes a port cover including a threaded interior portion configured to screw on to the threaded exterior portion of the seal retainer of the injection port such that the port cover is removably couplable to the seal retainer, the port cover and having an open and a closed state, where the self-sealing port is accessible by the injector needle when the port cover is in the open state, and the self-sealing port is inaccessible by the injector needle when the port cover is in the closed state. The method including the further steps of removing the removable masking layer from the package couple and exposing the adhesive layer, adhering the package couple to the sealed food package via the adhesive layer; inserting the self-sealing port into the injection port, coupling the injection port with inserted self-sealing port to the port support couple, and screwing the port cover onto the injection port.

BRIEF DESCRIPTION OF THE DRAWINGS

These figures illustrate various exemplars of the disclosed device or method, an apparatus for introducing a liquid into a sealed food package via an injector needle.

FIG. 5 is a flow diagram illustrating a method of use for an apparatus for introducing a liquid into a sealed food package via an injector needle.

DETAILED DESCRIPTION

As discussed above, embodiments of the present disclosure relate to a food or edible material processes, compositions, and products and, more particularly, to an apparatus for introducing a liquid into a sealed food package via an injector needle to improve the internal application of non-transitory fluent material to solid edible by injecting, artificial pore formation or external pressure.

Generally, the apparatus is a semi-reusable device that allows the consumer to inject flavoring directly into a cryovac or any vacuum-packed meats without having the liquid escape. Traditionally, when trying to inject meats, the consumer has to prep it and put it in a bag, or open pan, which the injection flavoring will eventually come out of. This is a huge waste of the flavoring and doesn't give you the full flavor since it leaks out. The best option is to use a vacuum-sealed bag, but if you puncture it, it's no longer vacuum sealed, and you have the same issue. The apparatus for introducing a liquid into a sealed food package via an injector needle may provide an easy-to-use, semi-reusable device that provides for keeping flavoring inside the meat while it's still vacuum sealed. Generally, the apparatus may include a package couple ring that may be stuck on the packed meat. Next, a port support couple may be attached to the package couple, such that a seal between the two parts is created. Likewise, a self-sealing port may be placed inside the injection port, so that creates a seal.

Further, the injection port may be snapped onto or otherwise coupled to the port support couple. A needle may be stuck through the self-sealing port and inject a marinade (or other liquid into the meat) in operation. The self-sealing port will reform when the needle is removed or otherwise keep a good seal. Embodiments may provide a screw-on port cover configured to further ensure sealing. In embodiments, the self-sealing port may be replaced or washed.

FIGS. 1-4, various views of an apparatus 100 for introducing a liquid into a sealed food package via an injector needle.

Figure 1:
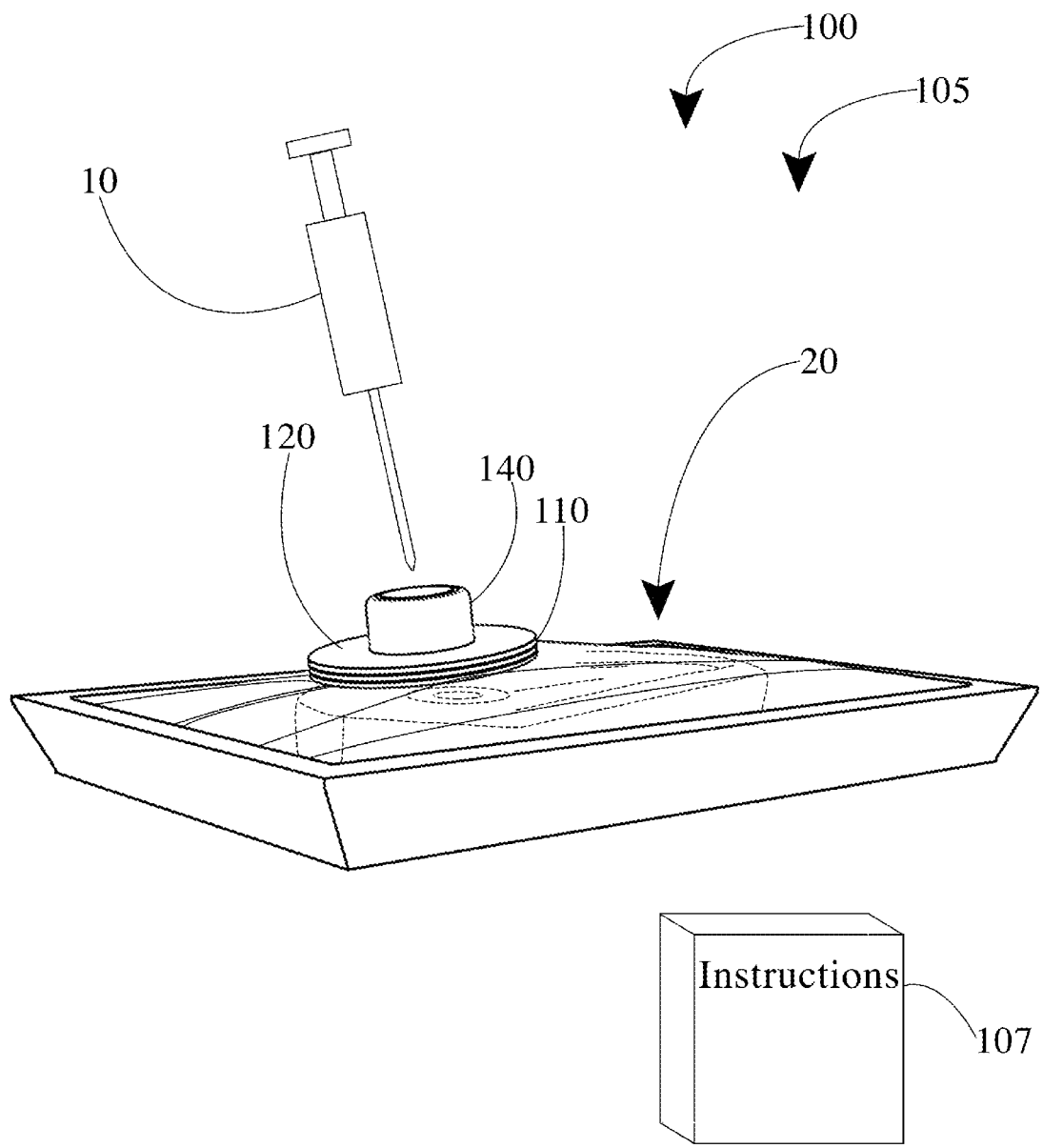
FIG. 1 is a perspective view of the apparatus for introducing a liquid into a sealed food package via an injector needle during an in-use condition.
Figure 2:
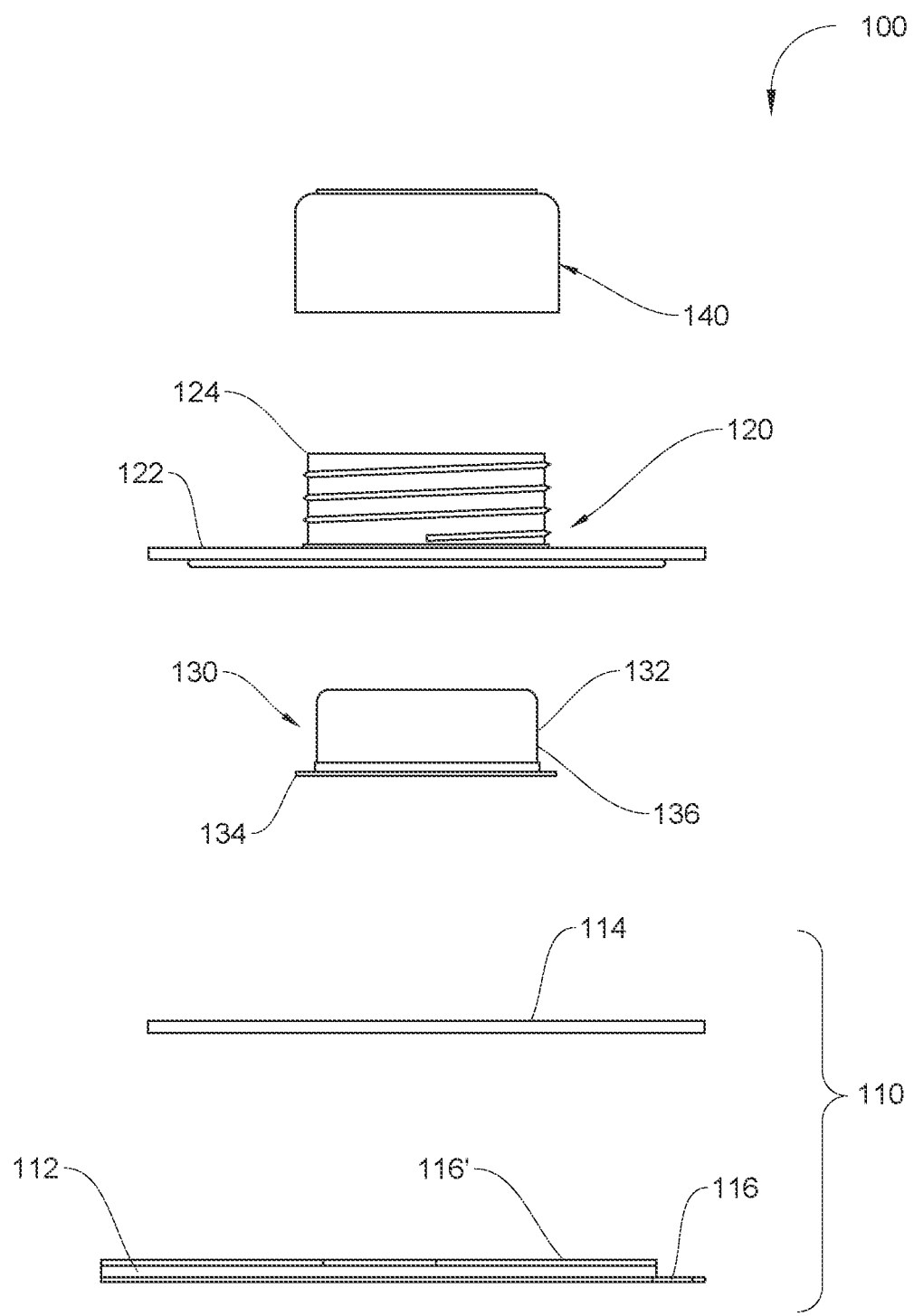
FIG. 2 is an exploded side view of the apparatus of FIG. 1.

FIG. 1 shows apparatus 100 for introducing a liquid into a sealed food package via an injector needle 10 during an in-use condition. The apparatus 100 may include an adhesive base 110, an injection port 120, and a self-sealing port 130 (FIG. 2). The apparatus 100 may further include a port cover 140.

According to one embodiment, apparatus 100 may further include instructions 107 and be arranged as a kit 105. Instructions 107 may detail functional relationships about the structure of the apparatus 100 (such that the apparatus 100 can be used, maintained, or the like, in a preferred manner).

FIG. 2 is an exploded side view of the apparatus 100 of FIG. 1. As above, the apparatus 100 may include the adhesive base 110, the injection port 120, and the self-sealing port 130, and alternately the port cover 140.

The adhesive base 110 may include a package couple 112 and a port support couple 114. Port support couple 114 is rigid and has a thickness. In some versions, port support couple 114 may have a groove. Package couple 112 is configured to adhesively attach to the sealed food package 20 (FIG. 1). Package couple 112 includes an adhesive layer configured to attach to the sealed food package 20 and removable masking layers 116, 116' removably affixed to the adhesive layer and configured to maintain adhesive properties of the adhesive layer until removed adhesively. One side of package couple 112 connects to sealed food package 20 after removing masking layer 116. The other side of package couple 112 connects to port support couple 114, in some exemplars, after removing masking layer 116'.

The injection port 120 may include a package base interface 122, a seal retainer 124, and ridge 123. The package base interface 122 is configured to removably couple to with the port support couple 114.

The apparatus 110 further includes a self-sealing port 130 disposed inside the seal retainer 124 and configured to permit insertion of the injector needle into the sealed food package 20 while otherwise maintaining a seal of the sealed food package 20. Self-sealing port 130 is cylindrical with a first diameter. Support wall 136 is the wall of the cylinder. Self-sealing port 130 connects to base gasket 134. In some versions, base gasket 134 is detached or detachable from self-sealing port 130, and in other versions, self-sealing port 130 and base gasket 134 are permanently connected. Base gasket 134 has a diameter greater than the first diameter of self-sealing port 130. In some versions, self-sealing port 130 seals inside of seal retainer 124 against the inner wall of seal retainer. The self-sealing port 130 maintains the seal upon removal of the injector needle. The self-sealing port 130 is configured to rest upon the port support couple 114, is made of a self-sealing material, such as rubber, and is food-safe. In some exemplars, self-sealing port 130 nests within seal retainer 124. In some of these exemplars, self-sealing port 130 slides up into seal retainer 124.

The port cover 140 is affixable to the injection port 120. It has an open and a closed state, where the self-sealing port 130 is accessible by the injector needle when the port cover 140 is in the open state, and the self-sealing port 130 is inaccessible by the injector needle when the port cover 140 is in the closed state. According to one embodiment, the port cover 140 may include a threaded interior portion, and the seal retainer 124 may include a threaded exterior portion. These components being configured to mate with each other respectively such that the port cover 140 is removably couplable to the seal retainer 124.

Figure 3:
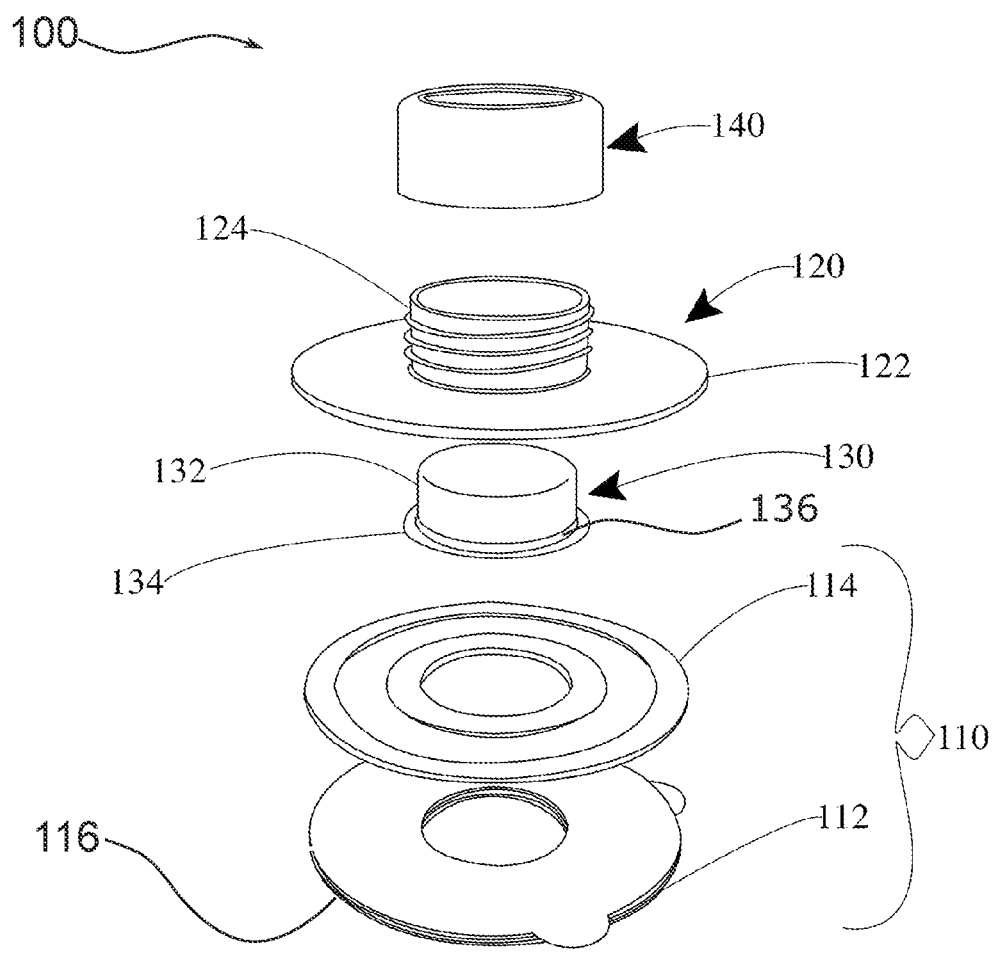
FIG. 3 is an exploded perspective view of the apparatus of FIG. 1.

FIG. 3 is an exploded perspective view of the apparatus 100 for introducing a liquid into a sealed food package via an injector needle of FIG. 1. As above, the apparatus 100 may include the adhesive base 110, the injection port 120, and the self-sealing port 130, and alternately the port cover 140. According to one embodiment, package couple 112 may include double-sided tape. Further, the removable masking layer 116 may include a protruding tab to assist with removal. Package couple 112 may be planar and configured to contour to the sealed food package 20. Port support couple 114 may be configured to attach to package couple 112.

As shown, the apparatus 100 may include the self-sealing port 130 having a support wall 136 and a deformable plug 132 positioned within the support wall, together configured to permit insertion of the injector needle, and further configured to maintain the seal upon removal of the injector needle. The self-sealing port 130 further includes a base gasket 134 fixed to and integrated with the deformable plug 132, the base gasket 134 configured to create a seal between the port support couple 114 and the package base interface 122 when the package base is interface 122 is coupled with the port support couple 114. Base interface 122 forms a snap couple with the port support couple 114 to connect to base interface 122. When support couple 114 connects to base interface 122, self-sealing port 130 sits between support couple 114 and base interface 122.

Figure 4:
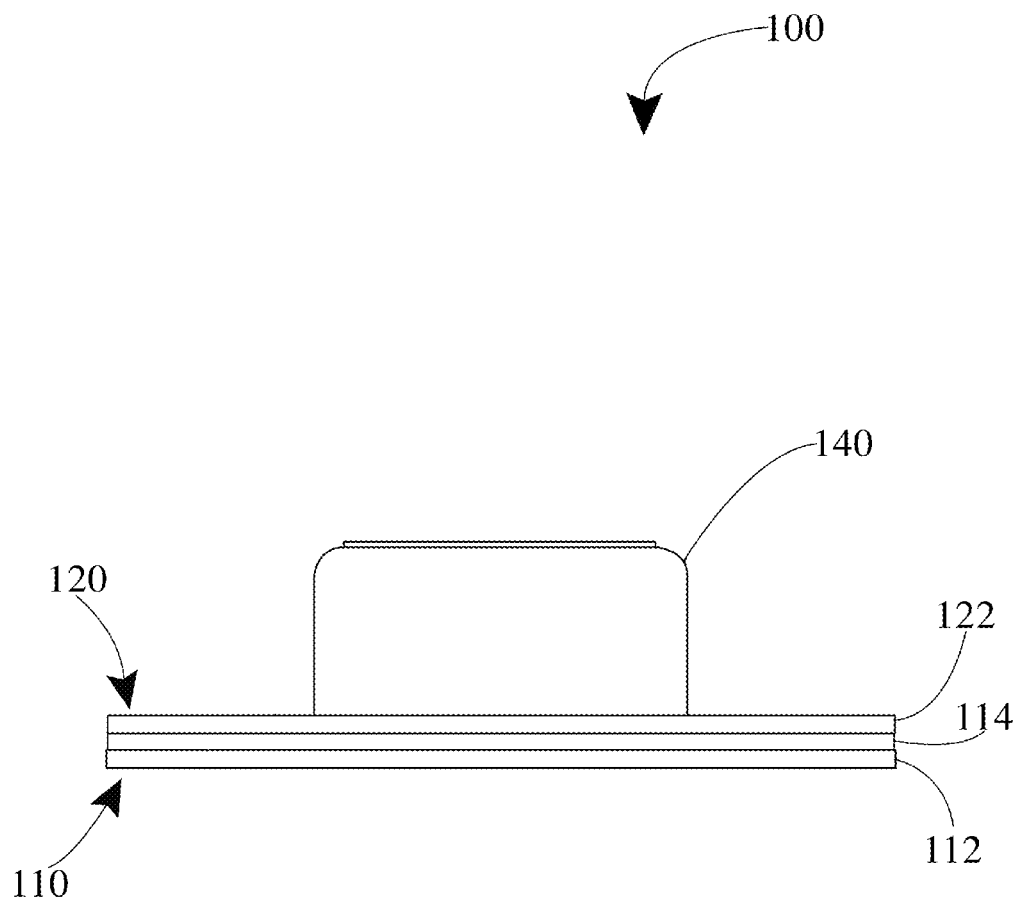
FIG. 4 is a side view of the apparatus of FIG. 1.

FIG. 4, a side view of the apparatus 100 of FIG. 1. As above, apparatus 100 may include the adhesive base 110, the injection port 120, and the self-sealing port 130 (FIG. 3), and alternately the port cover 140. As shown, when assembled, the apparatus 100 may provide a compact sealed port or entryway that allows for a liquid such as a marinade or other food-safe solution can be introduced into the sealed food package 20 (FIG. 1) via the injector needle 10 (FIG. 1), after being stuck onto the sealed food package 20.

FIG. 5 is a flow diagram illustrating a method 500 for introducing a liquid into a sealed food package via an injector needle. As illustrated, a method 500[0] may include the steps of providing 500 the apparatus 100, the apparatus including the adhesive base 110, the injection port 120, the self-sealing port 130, and the port cover 140 (as described above); removing 501 the removable masking layer 116' from the package couple 112 and exposing a first side of the adhesive layer; adhering 502 the package couple 112 to the port support couple 114 via the adhesive layer; removing 503 the removable masking layer 116 from the package couple 112 and exposing a first side of the adhesive layer; adhering 504 the package couple 112 to the sealed food package 20 via the adhesive layer; attaching the injection port 120 to the port support couple 114; inserting 505 the self-sealing port 130 into the injection port 120; coupling 506 the injection port 120 with inserted self-sealing port 130 to the port support couple 114; and screwing 506 the port cover 140 onto the injection port 120. The method further may include the optional steps of unscrewing 508 the port cover 140 from the injection port 120; decoupling 509 the injection port 120 from the port support couple 114, and removing 510 the self-sealing port 130 from the injection port 120.

It should be noted that the optional steps of the method of use 500 are illustrated using dotted lines in FIG. 5 to distinguish them from the other steps of the method of use 500. It should also be noted that the steps described in the method of use can be carried out in many different orders according to user preference. The use of "step of" should not be interpreted as "step for", in the claims and is not intended to invoke the provisions of 35 USC § 112(f). It should also be noted that, under appropriate circumstances, considering such issues as design preference, user preferences, marketing preferences, cost, structural requirements, available materials, technological advances, etc., other methods for an apparatus for introducing a liquid into a sealed food package via an injector needle 100 (e.g., different step orders within the list mentioned above, elimination or addition of specific steps, including or excluding certain maintenance steps, etc.), are taught.

The embodiments of the invention described are exemplary. Numerous modifications, variations, and rearrangements can be readily envisioned to achieve equivalent results, all of which are intended to be embraced within the spirit and scope of the invention.

What is claimed is:

1. A method the steps of:
providing an apparatus with
an adhesive package couple
a rigid port support couple
a rigid injection port including a package base interface and a seal
retainer disposed above the package base interface and
a self-sealing needle port disposed in the injection port;
removing a masking layer from the package couple and exposing an adhesive surface;
adhering the package couple to a sealed food package;
inserting the self-sealing needle port into the injection port;
coupling the injection port to the port support couple; and
injecting a liquid into the food package.

2. The method of claim 1, further comprising the steps of decoupling the injection port from the port support couple.

* * * * *